US010388103B1

United States Patent

(12) United States Patent
Knust et al.

(10) Patent No.: US 10,388,103 B1
(45) Date of Patent: Aug. 20, 2019

(54) DATA TRANSPORT SYSTEM AND METHOD FOR HOSPITALITY INDUSTRY

(71) Applicant: Genesis Gaming Solutions, Inc., Spring, TX (US)

(72) Inventors: Randy L. Knust, The Woodlands, TX (US); Eric Schoppe, Conroe, TX (US)

(73) Assignee: Genesis Gaming Solutions, Inc., Spring, TX (US)

( * ) Notice: Subject to any disclaimer, the term of this patent is extended or adjusted under 35 U.S.C. 154(b) by 64 days.

(21) Appl. No.: 13/625,058

(22) Filed: Sep. 24, 2012

Related U.S. Application Data

(60) Provisional application No. 61/538,077, filed on Sep. 22, 2011.

(51) Int. Cl.
*G06Q 30/02* (2012.01)
*G06Q 30/06* (2012.01)
*G07F 17/32* (2006.01)

(52) U.S. Cl.
CPC ............ *G07F 17/32* (2013.01); *G06Q 30/02* (2013.01); *G06Q 30/0253* (2013.01); *G06Q 30/06* (2013.01); *G07F 17/323* (2013.01)

(58) Field of Classification Search
CPC ...... G06Q 30/02; G06Q 10/02; G06Q 10/109; G06Q 10/1095; G06Q 50/12; G06Q 30/06; G06Q 10/087; G06Q 10/1053; G06Q 30/0253; H04L 67/04; G07F 17/32; G07F 17/323; G07F 17/30566
USPC ......... 705/5, 7.19, 7.24, 2, 28, 37, 320, 321; 709/203, 223, 224, 206, 248; 463/25, 43
See application file for complete search history.

(56) References Cited

U.S. PATENT DOCUMENTS

| | | | | |
|---|---|---|---|---|
| 6,854,010 | B1 * | 2/2005 | Christian et al. | 709/223 |
| 7,076,451 | B1 * | 7/2006 | Coupland et al. | 705/5 |
| 7,188,073 | B1 * | 3/2007 | Tam et al. | 705/7.16 |
| 7,325,036 | B2 | 1/2008 | Simyon et al. | |
| 7,565,414 | B1 | 7/2009 | Love | |
| 8,682,806 | B1 * | 3/2014 | Cate | G06Q 10/1053 705/1.1 |
| 8,874,458 | B1 * | 10/2014 | Ande | G06Q 10/08 701/120 |
| 9,043,274 | B1 * | 5/2015 | Cheng | G06F 16/185 707/613 |
| 2001/0005831 | A1 * | 6/2001 | Lewin | G06Q 10/02 705/5 |

(Continued)

*Primary Examiner* — Ranodhi Serrao
*Assistant Examiner* — James N Fiorillo
(74) *Attorney, Agent, or Firm* — Winstead PC

(57) ABSTRACT

In one embodiment, a method includes, at a central data center including at least one server computer, maintaining central hospitality data for a plurality of hospitality systems. The method further includes serving, by the central data center, at least a portion of the central hospitality data to a plurality of computing devices operated by hospitality consumers. The method also includes, at the central data center, receiving, at regular intervals, an automated email from each hospitality system of the plurality of hospitality systems. Each automated email encapsulates updated local hospitality data gathered by the hospitality system. In addition, the method includes, at the central data center, retrieving the updated local hospitality data from each automated email. Also, the method includes, at the central data center, updating the central hospitality data per the updated local hospitality data.

15 Claims, 1 Drawing Sheet

(56) References Cited

U.S. PATENT DOCUMENTS

2001/0027481 A1* 10/2001 Whyel .......................... 709/218
2003/0003988 A1* 1/2003 Walker ................... G06Q 30/02 463/21
2003/0041045 A1* 2/2003 Sun ..................... H04M 3/4228
2004/0002388 A1* 1/2004 Larsen .................... G07F 17/32 463/43
2004/0039679 A1* 2/2004 Norton ................... G06Q 30/06 705/37
2004/0267567 A1* 12/2004 Barrera .................. G06Q 10/02 705/2
2005/0096124 A1* 5/2005 Stronach ................ G06Q 30/06 463/25
2005/0251554 A1* 11/2005 Fong ..................... H04L 43/065 709/206
2005/0277463 A1 12/2005 Knust et al.
2005/0289198 A1* 12/2005 Todd ..................... G06F 16/273
2006/0031323 A1* 2/2006 Johnson .................. H04L 51/14 709/206
2006/0085503 A1* 4/2006 Stoye et al. .................. 709/206
2008/0171592 A1* 7/2008 Doan ...................... G07F 17/32 463/25
2008/0215761 A1* 9/2008 Johnson .................. H04L 51/14 709/248
2009/0172035 A1* 7/2009 Lessing ................. G06F 16/284
2010/0179940 A1* 7/2010 Gilder ................... G06F 16/258 707/622
2011/0167205 A1* 7/2011 Karamcheti et al. ......... 711/103
2011/0202269 A1* 8/2011 Reventlow .................... 701/201
2013/0013350 A1* 1/2013 McCullough et al. ........... 705/5

* cited by examiner

DATA TRANSPORT SYSTEM AND METHOD FOR HOSPITALITY INDUSTRY

CROSS-REFERENCE TO RELATED APPLICATIONS

This application claims priority from, and incorporates by reference the entire disclosure of, U.S. Provisional Application No. 61/538,077 filed on Sep. 22, 2011. This application incorporates by reference U.S. Patent Application Publication No. 2005/0277463.

BACKGROUND

Technical Field

The invention relates generally to data transportation and more particularly, but not by way of limitation, to systems and methods for providing hospitality data to consumers.

History of Related Art

Hospitality establishments such as, for example, casinos and restaurants, are in the business of providing hospitality resources to consumers. Depending on a type of hospitality establishment, the hospitality resources may include, for example, gaming tables or machines, restaurant tables, and the like. The availability of hospitality resources often fluctuates considerably based on factors such as time of day, staffing, and special events. During periods of low availability, consumers may be placed in a queue and forced to wait until a desired hospitality resource becomes available.

At any given time, availability of hospitality resources can vary significantly across hospitality establishments. Thus, although one hospitality establishment may be experiencing low availability for a desired hospitality resource, other comparable hospitality establishments may have high availability. To the extent possible, consumers often attempt to assess availability of a desired hospitality resource before selecting a hospitality establishment to visit. Efforts in this regard may involve, for example, visiting a website for a hospitality establishment or calling the hospitality establishment. However, such efforts generally result in availability information for a single hospitality establishment. Therefore, checking availability at multiple hospitality establishments is time consuming and tedious.

Traditional solutions to integrate data from multiple systems involve setup and configuration of some manner of dedicated data transfer using, for example, a virtual private network. However, hospitality establishments and the hospitality systems operating therein differ greatly in complexity and in network sophistication. Therefore, dedicated data transfer is frequently not a feasible or economical option.

SUMMARY OF THE INVENTION

In one embodiment, a method includes, at a central data center including at least one server computer, maintaining central hospitality data for a plurality of hospitality systems. The method further includes serving, by the central data center, at least a portion of the central hospitality data to a plurality of computing devices operated by hospitality consumers. The method also includes, at the central data center, receiving, at regular intervals, an automated email from each hospitality system of the plurality of hospitality systems. Each automated email encapsulates updated local hospitality data gathered by the hospitality system. In addition, the method includes, at the central data center, retrieving the updated local hospitality data from each automated email. Also, the method includes, at the central data center, updating the central hospitality data per the updated local hospitality data.

In one embodiment, a system includes a central data center comprising an email server. The central data center is operable to maintain central hospitality data for a plurality of hospitality systems and serve at least a portion of the central hospitality data to a plurality of computing devices operated by hospitality consumers. The central data center is also operable to receive, at regular intervals, an automated email from each hospitality system of the plurality of hospitality systems. Each automated email encapsulates updated local hospitality data generated by the hospitality system. The central data center is further operable to retrieve the updated local hospitality data from each automated email. In addition, the central data center is operable to update the central hospitality data per the updated local hospitality data.

In one embodiment, a computer-program product includes a computer-usable medium having computer-readable program code embodied therein. The computer-readable program code adapted to be executed to implement a method. The method includes maintaining central hospitality data for a plurality of hospitality systems. The method further includes serving at least a portion of the central hospitality data to a plurality of computing devices operated by hospitality consumers. The method also includes receiving, at regular intervals, an automated email from each hospitality system of the plurality of hospitality systems. Each automated email encapsulates updated local hospitality data gathered by the hospitality system. In addition, the method includes retrieving the updated local hospitality data from each automated email. Also, the method includes updating the central hospitality data per the updated local hospitality data.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
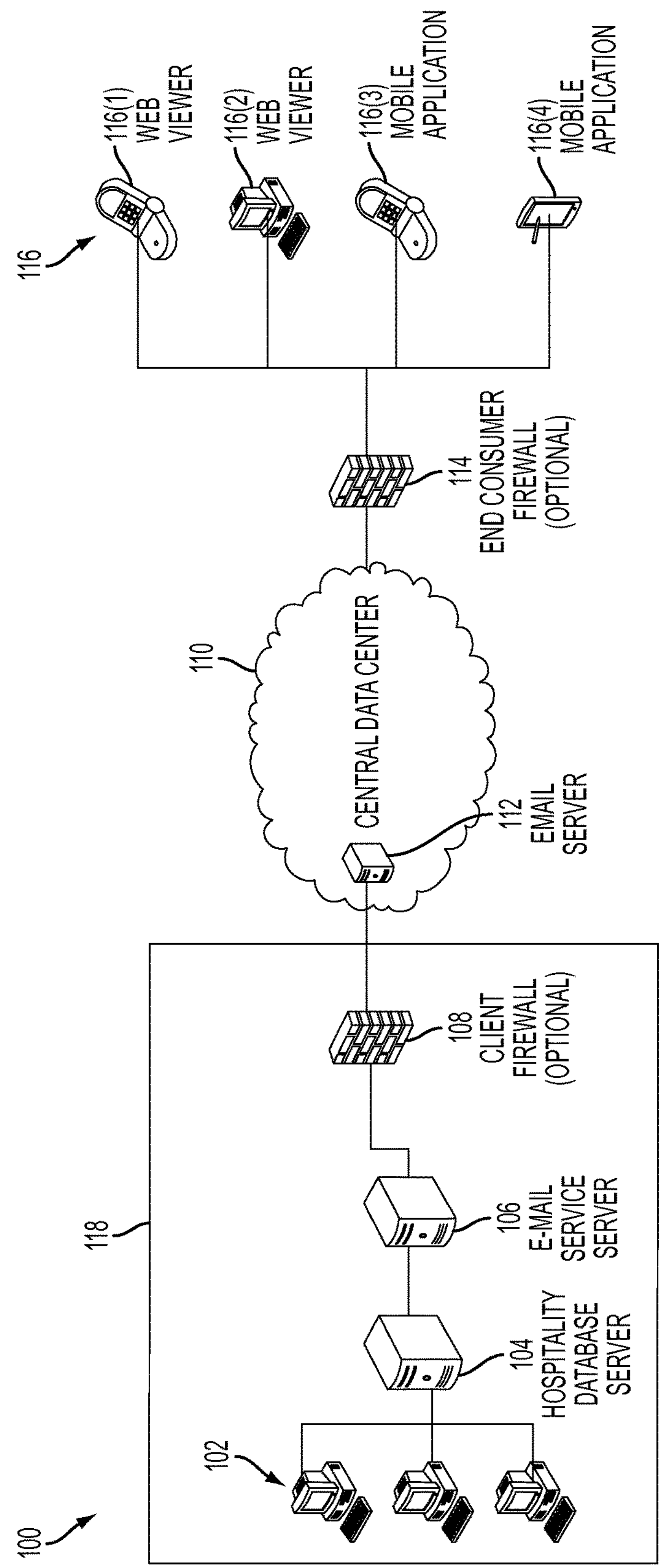
FIG. 1 illustrates a system for transporting hospitality data between one or more hospitality establishments and a consumer.

In various embodiments, a system and method as described herein enables improved transportation of hospitality data from a hospitality establishment such as, for example, a restaurant, casino, or hotel, to a consumer. As used herein, hospitality data refers to any data related to a service or resource provided by a hospitality establishment to consumers. For example, hospitality data can relate to the availability or scheduling of the service or resource that the hospitality establishment provides (e.g., availability of gaming tables or tournaments at a casino, availability of tables at a restaurant, etc.). By way of further example, hospitality data can relate to upcoming promotions or events at the hospitality establishment. In addition, hospitality data can included tournament information for an ongoing poker tournament such as, for example, a current description of a tournament, level, blinds, participants, prize pool, remaining players, next prize amount, remaining prize amount, and the like.

FIG. 1 illustrates a system 100 for transporting hospitality data between one or more hospitality establishments and a consumer. The system 100 includes one or more hospitality systems 118, a central data center 110, an optional firewall 114, and a plurality of computing devices 116. Each of the one or more hospitality systems 118 includes one or more hospitality computers 102, a hospitality database server 104, an email service server 106, and an optional firewall 108.

In various embodiments, as illustrated, the central data center 110 represents a cloud-hosted configuration that is accessible over a network such as, for example, the Internet. In these embodiments, the central data center 110 benefits from cloud services and shared resources of a cloud environment. In various other embodiments, the central data center 110 represents a solution that is hosted on one or more dedicated servers that are accessible over a network such as, for example, the Internet. The central data center 110 includes an email server 112. The central data center 110 further includes other computer hardware and software components that permit storage and access to data. It should be appreciated that FIG. 1 depicts an illustrative implementation of the system 100. The functionality discussed herein with respect to specific computers or servers may be distributed to any number of physical or virtual computers.

Each of the one or more hospitality systems 118 facilitates operation of a hospitality establishment and maintains local hospitality data. As used herein, local hospitality data refers to hospitality data that is generated and stored by a hospitality system serving a specific hospitality establishment. In a typical embodiment, the plurality of hospitality computers 102 and the hospitality database server 104 collectively represent all or a portion of a pre-existing hospitality system utilized by the hospitality establishment. For example, in various embodiments in which the hospitality establishment is a casino or a restaurant, the pre-existing hospitality system may be a casino-management system or a restaurant-management system, respectively. U.S. Patent Application Publication No. 2005/0277463, which is incorporated herein by reference, describes an exemplary hospitality system for a casino that may be represented by the plurality of hospitality computers 102 and the hospitality database server 104. U.S. Patent Application Publication No. 2005/0277463 further provides examples of local hospitality data that can be generated by the exemplary hospitality system.

In a typical embodiment, the email service server 106 runs an email service that utilizes email technology to bridge the preexisting system with centralized, aggregated storage provided by the central data center 110. In particular, the email service server 106 is operable to communicate with the hospitality database server 104 to request and obtain all or part the local hospitality data. The email service server 106 transmits hospitality data via email through the optional firewall 108 to the central data center 110 (e.g., to the email server 112). Thus, as described in greater detail below, the one or more hospitality systems 118 are operable to communicate via email with the central data center 110 with minimal network configuration.

The central data center 110 maintains central hospitality data for the system 100. As used herein, central hospitality data refers to hospitality data that is aggregated from local hospitality data received from hospitality systems such as, for example, the one or more hospitality systems 118. The email server 112 in the central data center 110 is operable to communicate with the one or more hospitality systems 118 via email and with a plurality of computing devices 116 over a network such as, for example, the Internet, through the optional firewall 114. One of ordinary skill in the art will appreciate that the email server 112 is exemplary in nature and is shown in order to describe various inventive features to one of ordinary skill in the art. The central data center 110 may utilize any number of physical or virtual computers to perform any functionality described herein with respect to the email server 112 or the central data center 110.

In operation, each of the one or more hospitality computers 102 generates, on an ongoing basis, new data that is stored by the hospitality database server 104 as part of the local hospitality data. The new data may include, for example, up-to-date information concerning the availability of the resource or service provided by the hospitality establishment. At configurable intervals (e.g., every ten minutes), the email service server 106 polls the hospitality database server 104 to gather local hospitality data. In various embodiments, the gathered local hospitality data may include the new data, all of the local hospitality data, or a desired subset of the local hospitality data.

In preparation for reporting to the central data center 110 and in real time, the email service server 106 encapsulates the gathered local hospitality data in an automated email according to a predefined data format. For example, the gathered local hospitality data may be placed in the body of the automated email or be made an attachment to the email. The email service server 106 transmits the automated email via, for example, the simple mail transfer protocol (SMTP), through the firewall 108 to a central email address associated with the central data center 110. In that way, the email service server 106 transmits hospitality-data reports, via email, to the central data center 110 at configurable intervals.

In a typical embodiment, the email service server 106 applies multiple layers of encryption in order to ensure secure transmission to the email server 112. For example, in a typical embodiment, the email service server 106 encrypts the automated email using Base64 encoding and transmits the automated email via a secure sockets layer (SSL) connection. Other methods of encryption or security may also be applied either in addition to or in place of one or both of the Base64 encoding and the SSL connection. In various embodiments in which security or data sensitivity is not a concern, encryption may be omitted.

Upon receipt of the automated email, the email server 112 retrieves the gathered local hospitality data by decrypting and parsing the automated email. The email server 112 stores the gathered local hospitality data as part of the central hospitality data according to a hospitality data model. In a typical embodiment, the email server 112 monitors the central email address for automated emails from any of the one or more hospitality systems 118. The central data center 110 updates the central hospitality data in the manner described above as hospitality-data reports are received.

Via the hospitality data model, the central data center 110 maintains the central hospitality data at a level of specificity sufficient to support filtering and manipulation. For example, in a typical embodiment, the central hospitality data is accessible by hospitality establishment, by type of hospitality establishment, by physical location (e.g., city, zip code), by distance radius from a physical location, and by type of hospitality resource (e.g., poker table, baccarat table, restaurant table, etc.). The level of specificity at which the central hospitality data is maintained may be made more or less specific depending on the requirements of a particular implementation. For example, in an implementation for the casino or gaming industry, the type of hospitality resource may include types of poker games such as, for example, Texas hold 'em or seven-card stud.

In various embodiments, the central data center 110 interacts with the plurality of computing devices 116 via either a platform-specific native application loaded on the computing device or a web application accessed via a browser. For example, the plurality of computing devices 116 are shown to include a mobile phone 116(1) and a desktop computer 116(2) that access the central data center 110 via a web application served over the Internet. By way of further example, the plurality of computing devices 116 are further shown to include a mobile phone 116(3) and a tablet computer 116(4) that communicate with the central data center 110 via a native application (e.g., a mobile application) loaded thereon.

The central data center 110 communicates and collaborates with the plurality of computing devices 116 to present a user interface to consumers. In a typical embodiment, the user interface allows consumers to access the central hospitality data according to consumer criteria. For example, for a given consumer, the consumer criteria may specify one or more hospitality establishments, a type of hospitality establishment, a physical location, a type of hospitality resource, a particular tournament, and/or other criteria. The plurality of computing devices 116 are operable to request hospitality data from the central data center 110 based on the consumer criteria. In various embodiments, the plurality of computing devices 116 may request hospitality data via, for example, an encrypted HTTPS call.

Responsive to a request, the central data center 110 serves up-to-date hospitality data to a requesting one of the plurality of computing devices 116. The up-to-date hospitality data is presented on the requesting one of the plurality of computing devices 116. A format of presentation is set by the web application or native application and may be modified according to consumer-formatting preferences. In various embodiments, the request and the consumer criteria contained therein represent a one-time search. In various other embodiments, the consumer criteria may be stored as consumer preferences on the central data center 110 and/or on the requesting one of the plurality of computing devices 116. In these embodiments, the plurality of computing devices 116 may be configured, via the web application or the native application, to request updated hospitality data, based on the consumer preferences, at configurable intervals (e.g., every ten minutes). The updated hospitality data is presented on the requesting one of the plurality of computing devices 116.

In various embodiments, the central data center 110 can acquire a location of the plurality of computing devices and provide updated hospitality data that is filtered according to the location. For example, the native application loaded on the mobile phone 116(3) may be operable to utilize location-determination capabilities of the mobile phone 116(3) to determine the location and transmit the location to the central data center 110. By way of example, in various embodiments, the mobile phone 116(3) may be equipped with a GPS receiver. By way of further example, the mobile phone 116(3) may be operable to determine the location through signal measurements such as, or example, angle of approach to cell towers, length of time for a signal to travel to multiple cell towers, or strength of a signal. Other location-determination methods may also be utilized such as, for example, Wi-Fi triangulation. In addition, in various embodiments, the central data center 110 may detect the location using an IP address of the plurality of computing devices 116.

In some embodiments, the system 100 supports communication of consumer data from the plurality of computing devices 116 to the one or more hospitality systems 118. In these embodiments, communication takes place as described above except in reverse fashion. The consumer data may include, for example, authentication information and a request or reservation for a hospitality resource (e.g., a gaming or restaurant table) at a particular hospitality establishment. In a typical embodiment, the authentication information serves to ensure the legitimacy of the request or reservation and to prevent request or reservation spamming. The authentication information may include, for example, identification information for a consumer. In various embodiments, the authentication information also includes payment information or includes sufficient information to pair the consumer with payment information that is stored on an appropriate hospitality system of the one or more hospitality systems 118.

In various embodiments, the system 100 provides numerous advantages. First, there is no requirement to setup dedicated data transfer between the central data center 110 and any of the one or more hospitality systems 118. Rather, the email service server 106 serves to bridge the hospitality database 104 to the email server 112 in the central data center 110. The email service server 106 and the central data center 110 utilize, for example, the SMTP protocol for message transfer, which is proven and almost universally supported. Therefore, the email service server 106 and the central data center 110 operate with minimal network configuration and allow differing levels of network sophistication.

In addition, as described above, the system 100 is configurable for particular hospitality establishments. For example, the email service server 106 polls the hospitality database 104 at intervals that are configurable. Thus, the intervals may be set according to a desired information latency. Furthermore, the system 100 as described above supports multiple layers of encryption in email transmission (e.g., use of Base64 encoding and SSL). In that way, hospitality data may be securely transmitted from the email service server 106 to the central data center 110. Moreover, as described above, the system 100 allows hospitality data to be presented to consumers according to consumer criteria. For example, in the casino industry, consumers may filter hospitality data to view, for example, live games, waiting lists, tournaments, and the like.

Further to the above examples, in various embodiments, the central data center 110 can also store and maintain central diagnostic information for the one or more hospitality systems 118. The central diagnostic information can include information about system failures, exceptions, or events. In a typical embodiment, the central diagnostic information can be maintained in a manner similar to that described with respect to central hospitality data. In that way, local diagnostic information can be gathered from the one or more hospitality systems 118 and stored as part of the central diagnostic information. The central diagnostic information is typically reported to technical personnel (rather than to consumers as described above relative to the central hospitality data) for purposes of resolving failures, exceptions, or events included therein.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:

at a central data center comprising at least one server computer, maintaining central resource-availability data for a plurality of local systems in a plurality of distinct physical locations:

wherein each local system of the plurality of local systems separately generates and stores local resource-availability data in the local system on a real-time, ongoing basis;

wherein, for each local system of the plurality of local systems, the local resource-availability data relates to an availability of one or more resources at a particular physical location at which the local system is located;

wherein each local system of the plurality of local systems comprises a local database server, a firewall, and an email service server that bridges the local database server to the central data center, the email service server configured to poll the local database server;

serving, by the central data center, at least a portion of the central resource-availability data to a plurality of computing devices operated by users;

wherein, for each local system of the plurality of local systems, the email service server repeatedly executes the following at a configurable interval:

gathering updated local resource-availability data from the local database server, the updated local resource-availability data comprising new data related to the availability of the one or more resources at the particular physical location;

in response to the gathering, encapsulating the updated local resource-availability data in an automated email according to a predefined format; and transmitting the automated email through the firewall to a central email address associated with the central data center;

at the central data center, monitoring the central email address and receiving each said automated email;

at the central data center, retrieving the updated local resource-availability data from each said automated email;

at the central data center, updating the served at least a portion of the central resource-availability data per the updated local resource-availability data of each said automated email as each said automated email is received;

acquiring, by the central data center, a physical location of at least one computing device of the plurality of computing devices;

filtering, by the central data center, the central resource-availability data according to the acquired physical location; and serving, by the central data center, the filtered central resource-availability data to the at least one computing device located at the acquired physical location.

2. The method of claim 1, wherein the serving comprises providing access to a central resource-availability database according to consumer criteria.

3. The method of claim 2, wherein the consumer criteria specifies at least one of a type of establishment, a physical location and a type of resource.

4. The method of claim 1, wherein the automated email is encrypted and the retrieving comprises decrypting the automated email.

5. The method of claim 1, wherein the serving comprises providing access to the central resource-availability data according to at least one of hospitality establishment, type of hospitality establishment, and physical location.

6. The method of claim 1, wherein the central resource-availability data relates to an availability of hospitality resources at a plurality of hospitality establishments associated with a plurality of hospitality systems.

7. The method of claim 1, the method comprising: responsive to the serving, receiving consumer data from at least one computing device of the plurality of computing devices; and wherein the consumer data comprises at least one of a request for a resource, a reservation for a resource, and authentication information.

8. A system comprising:

a central data center comprising an email server further comprising a processor coupled to a memory;

a plurality of local systems in a plurality of distinct physical locations, wherein each local system of the plurality of local systems separately generates and stores local resource-availability data in the local system on a real-time, ongoing basis;

wherein, for each local system of the plurality of local systems, the local resource-availability data relates to an availability of one or more resources at a particular physical location at which the local system is located;

wherein each local system of the plurality of local systems comprises:

a processor coupled to a memory;

a firewall;

a local database server; and an email service server that bridges the local database server to the central data center, the email service server configured to poll the local database server;

wherein, for each local system of the plurality of local systems, the email service server is configured to repeatedly execute the following at a configurable interval:

gather updated local resource-availability data from the local database server, the updated local resource-availability data comprising new data related to the availability of the one or more resources at the particular physical location;

encapsulate the updated local resource-availability data in an automated email according to a predefined format; and transmit the automated email through the firewall to a central email address associated with the central data center;

wherein the central data center is operable to:

maintain central resource-availability data for the plurality of local systems;

serve at least a portion of the central resource-availability data to a plurality of computing devices operated by users;

monitor the central email address and receive each said automated email; retrieve the updated local resource-availability data from each said automated email;

update the served at least a portion of the central resource-availability data per the updated local resource-availability data of each said automated email as each said automated email is received;

acquire a physical location of at least one computing device of the plurality of computing devices;

filter the central resource-availability data according to the acquired physical location; and serve the filtered central resource-availability data to the at least one computing device located at the acquired physical location.

9. The system of claim 8, wherein the operability to serve comprises operability to provide access to a central database according to consumer criteria.

10. The system of claim 9, wherein the consumer criteria specifies at least one of a type of hospitality establishment, a physical location and a type of hospitality resource.

11. The system of claim 8, wherein each said automated email is encrypted and the retrieval comprises decrypting each said automated email.

12. The system of claim 8, wherein the operability to serve comprises operability to provide access to the central resource-availability data according to at least one of hospitality establishment, type of hospitality establishment, and physical location.

13. The system of claim 8, wherein the central resource-availability data relates to an availability of hospitality resources at a plurality of hospitality establishments associated with the plurality of hospitality systems.

14. The system of claim 8, wherein the central data center is operable to: responsive to the service of at least a portion of the central resource-availability data, receive consumer data from at least one computing device of the plurality of computing devices; and wherein the consumer data comprises at least one of a request for a hospitality resource, a reservation for a hospitality resource, and authentication information.

15. A non-transitory computer-program product comprising a computer-usable medium having computer-readable program code embodied therein, the computer-readable program code adapted to be executed to implement a method comprising:

at a central data center comprising at least one server computer, maintaining central resource-availability data for a plurality of local systems in a plurality of distinct physical locations;

wherein each local system of the plurality of local systems separately generates and stores local resource-availability data in the local system on a real-time, ongoing basis;

wherein, for each local system of the plurality of local systems, the local resource-availability data relates to an availability of one or more resources at a particular physical location at which the local system is located;

wherein each local system of the plurality of local systems comprises a local database server, a firewall, and an email service server that bridges the local database server to the central data center, the email service server configured to poll the local database server;

serving, by the central data center, at least a portion of the central resource-availability data to a plurality of computing devices operated by users;

wherein, for each local system of the plurality of local systems, the email service server repeatedly executes the following at a configurable interval:

gathering updated local resource-availability data from the local database server, the updated local resource-availability data comprising new data related to the availability of the one or more resources at the particular physical location;

in response to the gathering, encapsulating the updated local resource-availability data in an automated email according to a predefined format; and transmitting the automated email to a central email address associated with the central data center;

at the central data center, monitoring the central email address and receiving each said automated email;

at the central data center, retrieving the updated local resource-availability data from each said automated email;

at the central data center, updating the served at least a portion of the central resource-availability data per the updated local resource-availability data of each said automated email as each said automated email is received;

acquiring, by the central data center, a physical location of at least one computing device of the plurality of computing devices;

filtering, by the central data center, the central resource-availability data according to the acquired physical location; and serving, by the central data center, the filtered central resource-availability data to the at least one computing device located at the acquired physical location.

* * * * *